(12) United States Patent
Ziemkowski et al.

(10) Patent No.: US 8,389,919 B2
(45) Date of Patent: Mar. 5, 2013

(54) LASER SAFETY CONTROLLER

(76) Inventors: Theodore Bruce Ziemkowski, Windsor, CO (US); John Bonvallet, Boulder, CO (US)

( * ) Notice: Subject to any disclaimer, the term of this patent is extended or adjusted under 35 U.S.C. 154(b) by 542 days.

(21) Appl. No.: 12/557,956

(22) Filed: Sep. 11, 2009

(65) Prior Publication Data

US 2010/0004794 A1 Jan. 7, 2010

Related U.S. Application Data

(63) Continuation-in-part of application No. 11/748,401, filed on May 14, 2007, now Pat. No. 7,663,091.

(60) Provisional application No. 60/800,157, filed on May 15, 2006.

(51) Int. Cl.
*G01J 1/32* (2006.01)
*G05D 3/12* (2006.01)
(52) U.S. Cl. ........................ 250/205; 700/297
(58) Field of Classification Search .................. 250/205, 250/551, 552, 214 LS, 214 SW, 214.1, 227.19, 250/206, 208.1, 221, 239, 238, 553; 700/90, 700/297; 362/157; 372/29.02; 315/86, 159
See application file for complete search history.

(56) References Cited

U.S. PATENT DOCUMENTS

| | | | |
|---|---|---|---|
| 4,672,215 A | 6/1987 | Howard | |
| 4,763,903 A | 8/1988 | Goodwin et al. | |
| 5,083,271 A | 1/1992 | Thacher et al. | |
| 5,216,443 A * | 6/1993 | Thornton et al. | 347/254 |
| 5,382,785 A * | 1/1995 | Rink | 250/205 |
| 5,762,503 A | 6/1998 | Hoo et al. | |
| 6,594,043 B1 | 7/2003 | Bloom et al. | |
| 6,918,845 B2 | 7/2005 | Kudla | |
| 2004/0080107 A1 | 4/2004 | Triplette | |
| 2005/0140930 A1 | 6/2005 | Dvorkis et al. | |
| 2006/0229843 A1 | 10/2006 | Freifeld | |

OTHER PUBLICATIONS

UC Davis Optics Club, 4 pages, archived online at http://web.archives.org/web/20051203012721 /opticsclub.engineering.ucdavis.edu/lazermaze.html, UC Davis Optics Club, 4 pages, archive date Mar. 12, 2005.
http://www.bostonpartymakers.com/performers/inflatables.htm, Boston Party Makers, 16 pages, date of photograph on p. 11 is Oct. 12, 2002.
Laser Maze, http://web.archieve.org/web/20041208215118/www.laserchaser.com/browse.php?frm_category=82, Dec. 8, 2004, World Wide Web.
"Lazer Maze", http://web.archive.org/web/20030612211548/http://laserchaser.com/, Jun. 12, 2003, retrieved Feb. 9, 2010.
"What's New", Playmeter Magazine, p. 43, Dec. 2002. "Short Takes", Funworld Magazine, p. 47, Feb. 2003.

* cited by examiner

*Primary Examiner* — Georgia Y Epps
*Assistant Examiner* — Don Williams
(74) *Attorney, Agent, or Firm* — Russell S. Krajec; Krajec Patent Offices, LLC

(57) ABSTRACT

A laser controller may operate a laser at a high power level, such as Class 3R, Class 3B, or higher, but may have safety interlocks to limit exposure to a safe level and may, as a system, be classified as Class 1. The laser controller may control a laser that transmits a light beam to a sensor, and may operate the laser in a high power mode when the sensor senses the light beam. While a laser is transmitting and the laser beam is not sensed, the laser may be operated within Class 1 power levels. When the light beam is broken, the laser controller may turn off the laser or change the power level to a safe level such that a person would not be exposed to any more energy than a Class 1 level. The laser controller may use various mechanisms to set a detection threshold and may use an ambient light sensor to determine when detection may be impossible.

20 Claims, 6 Drawing Sheets

LASER SAFETY CONTROLLER

CROSS REFERENCE TO RELATED APPLICATIONS

This application claims priority to and benefit of U.S. Provisional Patent Application Ser. No. 60/800,157, filed May 15, 2006 by Ted Ziemkowski entitled "Laser Trapped, Timed, Challenge Attraction", U.S. patent application Ser. No. 11/748,405, filed May 14, 2007 entitled "Laser Maze", and U.S. patent application Ser. No. 11/748,401, filed May 14, 2007 entitled "Laser Controller", the entire contents of which are hereby expressly incorporated by reference.

BACKGROUND

Many applications exist where humans may interact with lasers. Because lasers can generate large amounts of power, lasers can inflict harm to humans, especially to a person's vision. Lasers often have very low divergence and high coherence, which can cause retinal damage with exposure at even low power levels.

A safety class system is defined in ANSI Z136 and IEC 60825 and sets forth several classes of lasers for use in industry. The following descriptions of the various class designations are general in nature and are not meant to precisely explain the class designations defined in the ANSI and IEC standards, which may be updated from time to time.

In general, Class 1 lasers are defined to be safe under all conditions of normal use. For example, a continuous laser at 600 nm wavelength can emit up to 0.39 mW and may be considered a Class 1 laser. Other wavelength lasers may have higher or lower permitted power output to be considered Class 1, as different wavelength light is attenuated differently in the human eye.

In general, Class 2 lasers are more powerful than Class 1 lasers, but rely on a human's blink reflex to limit the exposure to less than 0.25 seconds and only apply to visible light lasers (400-700 nm). Class 2 lasers are generally limited to 1 mW continuous wave.

In general, a Class 3B laser is hazardous if the eye is exposed directly, but diffuse reflections such as from paper or other matte surfaces are generally not considered harmful. Within Class 3B, continuous lasers in the wavelength range from 315 nm to far infrared are limited to 0.5 W. For pulsed lasers between 400 and 700 nm, the limit is 30 mJ. Other limits apply to other wavelengths and to ultrashort pulsed lasers. Protective eyewear is typically used where direct viewing of a class 3B laser beam may occur. Class-3B lasers generally are equipped with a key switch and a safety interlock.

In general, a Class 3R laser is considered safe when handled carefully, with restricted beam viewing. The Maximum Permitted Exposure can be exceeded, but with a low risk of injury. Visible continuous lasers in Class 3R are typically limited to 5 mW. Other limits may apply to pulsed lasers and lasers in other wavelengths.

In applications where a laser beam is used for detection, higher powered lasers may be desired so that the laser beam may be more accurately and effectively sensed. However, the more powerful lasers can inflict harm.

SUMMARY

A laser controller may operate a laser at a high power level, such as Class 3R, Class 3B, or higher, but may have safety interlocks to limit exposure to a safe level and may, as a system, be classified as Class 1. The laser controller may control a laser that transmits a light beam to a sensor, and may operate the laser in a high power mode when the sensor senses the light beam. While a laser is transmitting and the laser beam is not sensed, the laser may be operated within Class 1 power levels. When the light beam is broken, the laser controller may turn off the laser or change the power level to a safe level such that a person would not be exposed to any more energy than a Class 1 level. The laser controller may use various mechanisms to set a detection threshold and may use an ambient light sensor to determine when detection may be impossible.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
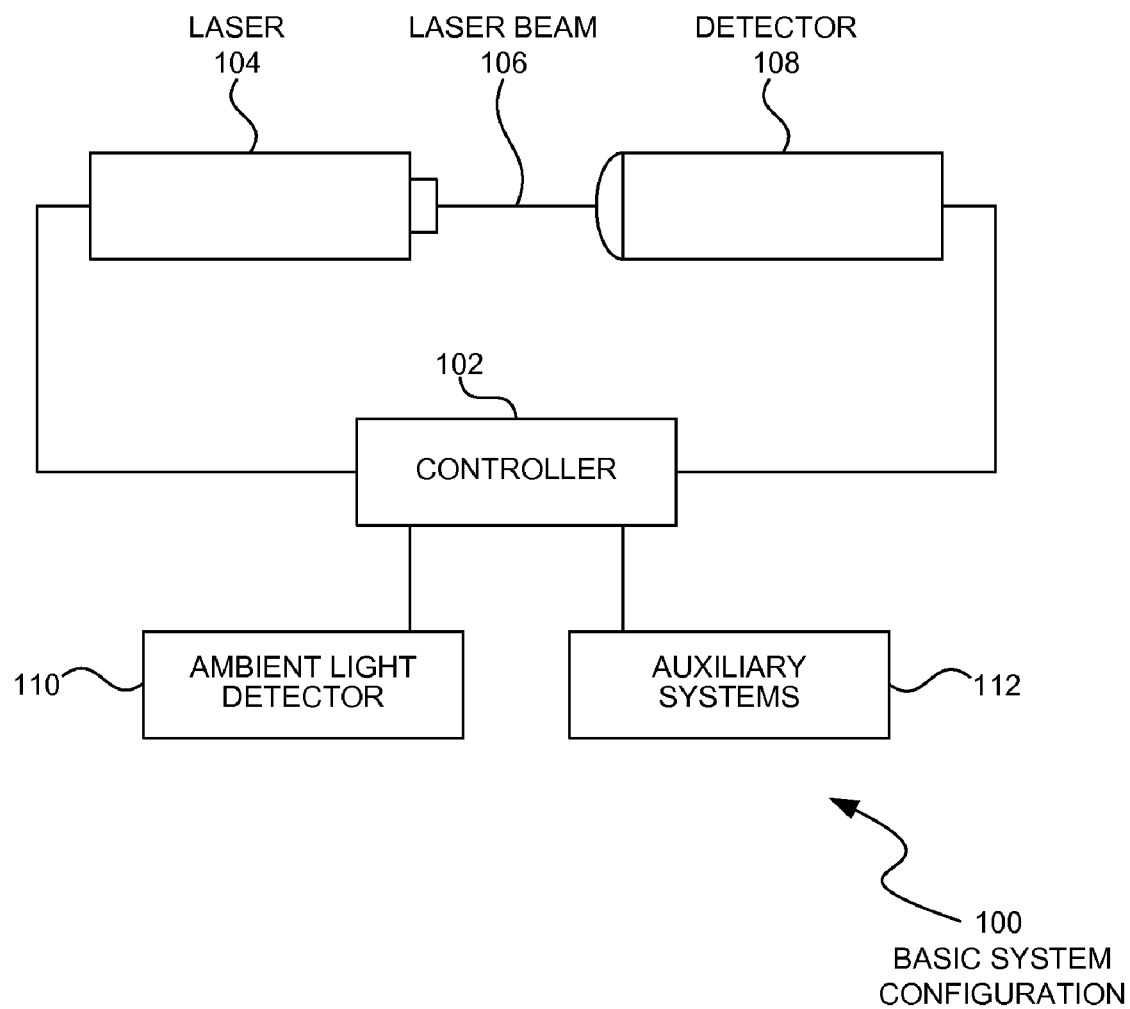
FIG. 1 is a diagram of an embodiment showing an example of a basic system configuration.

A laser controller may operate one or more lasers in a manner such that the lasers may limit human exposure to the lasers, but while operating the lasers in a high power mode during normal operation. The laser controller may operate the lasers in a high power mode when the laser beam is affirmatively detected by a sensor. When the sensor does not detect the laser beam, the laser is turned off or operated in a low power mode.

The system may enable Class 3B or Class 3R lasers to be operated in a Class 1 manner when the controller performs the controlling operations within a short period of time. For example, the system may operate a Class 3R laser as compliant with Class 1 when the controller can turn off or reduce the power level of the Class 3R laser within 0.25 seconds, depending on the laser wavelength.

A laser controller may protect a human during both startup and operational phases. During startup, the laser controller may limit laser operation in a lower power mode until a sensor detects the laser beam. After the laser beam is detected, the laser controller may then operate the laser in a high power mode. In general, the low power mode may be compliant with Class 1 while the high power mode may be a higher power level, such as Class 2, Class 3R, or Class 3B.

During operation, the laser controller uses a sensor to detect the laser beam. The sensor may receive the laser beam by being the endpoint of the laser beam. The sensor may be configured so that the laser beam, if broken or misaligned, is no longer sensed. The sensor is sensing the laser beam, the configuration ensures that the laser beam cannot be striking a human. If the laser beam is broken or misaligned, the laser controller may be configured to assume that the laser beam may strike a human and thus is operated in a low power manner, such as Class 1 or Class 2.

For example, the laser controller may be configured to sense a laser beam, and when the laser beam is broken, turn off the laser within a very short period of time or lower the laser power level to a safe level within the short period of time. In a typical embodiment, such a change may occur within 0.25 seconds, for example. Such a system may limit any potential human exposure to less than 0.25 seconds.

The laser controller may use an ambient light sensor to determine if the sensor would be capable of detecting the laser beam, and may also encode the laser beam with a signal to enable positive detection. In some such embodiments, two or more laser beams may be individually sensed and controlled using a single sensor.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a basic configuration of a laser and detector. Embodiment 100 is a simplified example of a system that might be used in detecting the presence of a person or object.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 has a controller 102 that may control a laser 104. The laser 104 may generate a laser beam 106 that is detected by the detector 108.

Lasers are known to potentially cause vision damage in humans. The controller 102 may operate the laser 104 at a power level that is potentially hazardous but without exposing a human to a hazardous level. This level of safety may be achieved in several manners. One manner may be to operate the laser beam 106 at a low power level if the laser beam 106 is not detected by the detector 108. Another manner may be to operate the laser 104 in a low power mode if the ambient light changes such that the ambient light may interfere with the detector 108.

During normal operation, the laser 104 may operate in high power mode when the detector 108 senses the laser beam 106. Otherwise, the laser 104 may be turned off or operated in a low power mode when the detector 108 does not detect the laser beam 106. Because there cannot be a human exposed to the laser beam 106 when the laser beam 106 is being received by the detector, operating in high power mode may still be safe for humans.

During alignment of the laser 104, the system may operate either in a high powered mode or a low powered mode. In a high powered mode, the system may potentially expose a human to the laser beam 106. Such a mode may be a maintenance mode or other special mode where a maintenance technician may wear safety glasses, be trained in laser hazards, or have other requirements for operating the laser 104. Some such systems may have interlocks or security features that permit trained technicians to operate the system in such a mode. Such a mode may operate at a Class 2, Class 3B, or Class 3R exposure level. After the alignment is complete and the detector 108 affirmatively detects the laser beam 106, the controller 102 may be activated and turn off the laser 104 in case of misalignment or if the laser beam is broken. In such a mode, the system may operate at a Class 1 or Class 2 exposure level.

During alignment of the laser 104, the system may operate in a low powered mode. In such a mode, the laser beam 106 may have a decreased signal until the detector 108 senses the laser beam 106. Once the detector 108 senses the laser beam 106, the controller 102 may turn the laser 104 to a high power mode. Such an alignment mode may be performed at safe exposure levels and may not require interlocks, specialized training, safety glasses, or other precautions for a high power laser system.

Humans have a blink reflex that causes the eye to blink if exposed to a bright light. In general, the blink reflex occurs in approximately 0.25 seconds. Also, there is a human aversion response that causes a human to instinctively look away from a light source. Thus, if a relatively high powered laser such as a Class 2, Class 3B, or even Class 3R laser is turned off within 0.25 seconds, the human cannot have a higher exposure than a Class 1 laser device. Some embodiments may turn off the laser within 300 milliseconds, 270 milliseconds, 250 milliseconds, 200 milliseconds, or other lengths of time. In some cases, the length of potential exposure may be a function of the wavelength of the light beam, and the maximum exposure time may be higher or lower depending on the color of the laser beam.

Class 4 lasers are generally any type of laser that has greater than Class 3 power levels. In general, Class 4 lasers can often burn a human's skin and are generally not used in applications where humans may come into contact with the laser beam.

The laser and detector system of embodiment 100 may be used in many different applications for sensing the absence of an object. In some applications, that object being sensed may be a human. When the laser beam 106 is affirmatively sensed by the detector 108, the system can affirmatively detect that no object is blocking the laser beam 106 and thus can affirmatively detect the absence of an object. If the detector 108 does not detect the laser beam 106, the system may be misaligned, partially inoperable, or an object may be present.

Examples of the uses of embodiment 100 may be for detecting the presence of a human for security systems, light curtain safety applications, or for game applications. When the laser beam 106 is in the visible spectrum, the laser beam 106 may be a visible indicator that a security system is operating, a safety issue is nearby, or may serve as an obstacle in a game or other amusement attraction.

Embodiment 100 may operate by controlling the intensity of the laser beam 106. When the laser is initially turned on, the controller 102 may cause the laser 104 to turn on at a safe power level, such as a Class 1 power level. After the laser 104 is operational at a Class 1 level, the detector 108 may be queried to determine if the laser is detected. If the laser is detected, the controller 102 may cause the laser 104 to be operated at a higher power level, such as Class 2, Class 3R, or Class 3B. The controller 102 may be capable of detecting when the laser beam 106 is broken and turning the laser 104 to a lower power level. In some embodiments, the laser 104 may be turned off completely when the laser beam 106 is broken.

When operating the embodiment 100, the controller 102 may set a detection threshold for the detector 106 by reading or querying the input signal from the detector prior to turning on the laser 104. Such an initial query may be used to set an ambient light threshold for the detector 108. The ambient light threshold may be used as a limit by which the presence or absence of the laser beam 106 may be detected. A signal above the ambient light threshold may be interpreted as sensing the laser beam 106 whereas a signal below the ambient light threshold may be interpreted as not sending the laser beam 106.

An ambient light threshold may serve a function of setting the sensitivity of a detector based on the initial ambient light sensed by the detector. In cases where there is bright ambient light, the threshold may be high, while when there is little or no ambient light, the threshold may be low.

In some embodiments, the controller 102 may use an ambient light detector 110 to determine the ambient light threshold for the detector 108. The ambient light detector 110 may be any type of detector that may sense non-laser light that may be received by the detector 108. Some such embodiments may use a calibrated ambient light detector 110 to determine a threshold for the detector 108.

Some embodiments may use an ambient light detector 110 to adjust the ambient light threshold for the detector 108 periodically or in real time. In such an embodiment, a change in the light sensed by the ambient light detector 110 may cause the ambient light threshold for the detector 108 to be adjusted.

In many such embodiments, if the adjusted ambient light threshold is too high, the detector 108 may not be capable of detecting the laser beam 106 and, in such a case, the laser 104 may be turned off or operated at a safe power level. An example may be a situation where the embodiment 100 is designed to be operated in a room with no light or very little light. If a bright overhead light is turned on, the detectors may not have enough dynamic range to sense the laser beam 106 in full light. When the laser beam 106 cannot be affirmatively detected, the laser beam 106 may be operated at low power.

The laser 104 may be any type of laser that may be controlled by the controller 102. In general, the laser 104 may be configured to be turned on and off by the controller 102 and may also be configured to have an output power level controlled by the controller 102. In some embodiments, the controller 102 may not be able to turn the lasers on and off, but may be only capable of changing the power level of the lasers. In still other embodiments, the controller 102 may be capable of only turning the lasers on and off without adjusting the power level.

The laser 104 may be connected to the controller 102 by various mechanisms. In one embodiment, electrical wires may directly connect the laser 104 to the controller 102. Such connections may include power for the laser 104 as well as a mechanism to control output power. In some cases, the controller 102 may control the power output of the laser 104 by regulating the power supplied to the laser 104. In other cases, the controller 102 may control the power output of the laser 104 by controlling another input to the laser 104.

The detector 108 may also be connected to the controller 102 by various mechanisms. In one embodiment, electrical wires may directly connect the detector 108 to the controller 102. Such connections may include power for the detector 108. In some embodiments, such as embodiment 300 presented later in this specification, the laser 104 may be connected to and controlled by the controller 102 through a network connection.

The controller 102 may have connections to various auxiliary systems 112. The auxiliary systems 112 may provide input to the controller 102, such as to send signals to the controller 102 to start the laser 104, as well as receive output from the controller 102, such as to receive a signal when the laser beam 106 is interrupted.

In many embodiments, the controller 102 may also perform many other functions, such as setting off an alarm if a laser beam is broken, causing a machine to operate while the laser beam is detected, or performing other functions for a particular application.

The laser 104 may be any type of laser, including visible light lasers. Visible light lasers may include red lasers, green lasers, and other colored lasers.

The laser beam 106 may be transmitted through any medium. In many cases, the laser beam 106 may be transmitted at least in part through air. In some cases, the laser beam 106 may be transmitted through various conductors, including light pipes, fiber optics, and other conductors. Some embodiments may use mirrors, reflectors, or other optical components to position and direct the laser beam 106 from the laser 104 to the detector 108.

Embodiment 100 illustrates a system with one laser and one detector. Other embodiments may have multiple lasers and multiple receivers.

In some embodiments, the auxiliary systems 112 may include a person sensor. A person sensor may be a motion detector, infrared sensor, or some other sensor that may sense that a person is present or nearby. When a person is sensed, the controller 102 may power on the laser 104 only to a low power mode, such as a safe mode. In some embodiments, the person sensor may be used to limit the power level of the laser 104 at a safe level, and the power level may be raised to a higher power level only when the detector 108 affirmatively senses the laser beam 108.

For the purposes of this specification and the claims, a "controller" may be a single processor controller or a combination of multiple processors. In some cases, a portion of the functions of a controller may be performed by one processor, programmable logic device, gate array, logic device, state machine, ladder logic controller, personal computer, microprocessor, hardwired logic device, or other controller element while other functions are performed by a different controller element. For example, a personal computer may be used to perform some functions such as a user interface or network connectivity while another controller element with a separate processor performs the laser control and sensing functions. The "controller" as used in this specification and claims may be of any architecture adapted to perform the functions described. Any reference to a controller architecture is for illustrative purposes and is not meant to be limiting.

Figure 2:
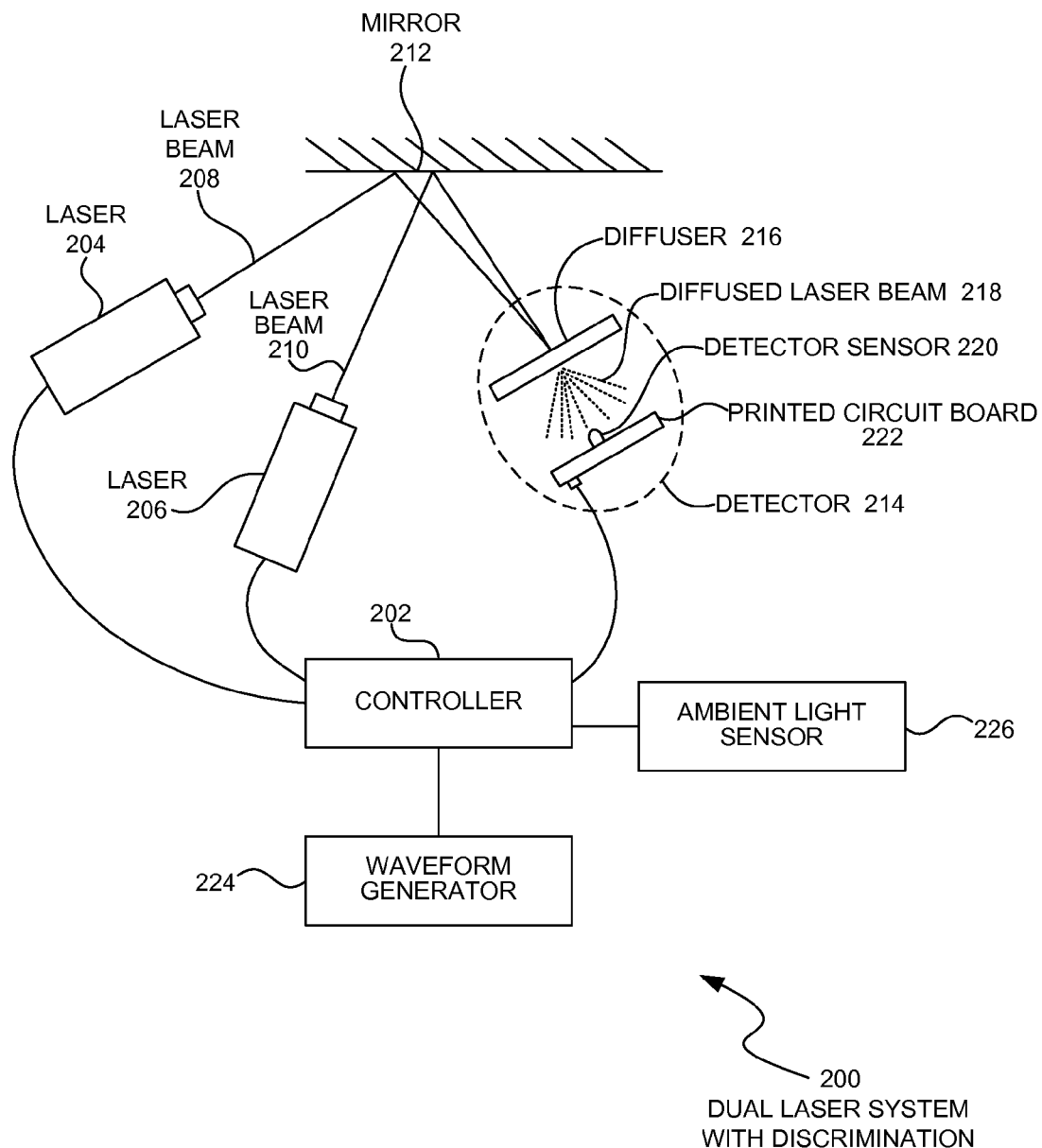
FIG. 2 is a diagram of an embodiment showing an example of a dual laser system with discrimination.

FIG. 2 is a diagram of an embodiment 200 showing a system with two lasers and a single detector. Embodiment 200 is a simplified example of a system that might be used when multiple laser beams are used in a single application.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a dual laser system that uses a single detector. Each laser may have a waveform applied to the respective laser beam so that the controller 202 may be able to sense and control each laser beam independently.

A controller 202 may control lasers 204 and 206, which may transmit laser beams 208 and 210, respectively. The laser beams 208 and 210 are illustrated as being reflected off of a mirror 212 and are detected by a detector 214.

When the laser beams 208 and 210 are being transmitted, the controller 202 may define a waveform that may be coupled to the transmission of a specific laser. The waveform may be an alternating current or other waveform, with different waveforms being coupled to each laser beam. The detector 214 or the controller 202 may be used to discriminate between the two laser beams and determine which one or both of the lasers are successfully transmitting a laser beam to the detector 214.

The laser configuration of embodiment 200 illustrates laser beams being reflected off a mirror. In many applications, laser beams may be reflected off of one or more mirrors to direct the laser beam across an area to be sensed. In some cases, a laser beam may be redirected many times through various mirrors, light pipes, fiber optics, and other optical conduits to cover a target area. Different embodiments may have different mirror configurations.

The detector 214 may be made up of a diffuser 216 that may diffuse the incoming laser beams 208 and 210 to create a diffused laser beam 218. A detector sensor 220 may be mounted on a printed circuit board 222, which may provide additional electronics or connections that interact with the controller 202.

The detector 214 and the various components that make up the detector 214 are examples of a mechanism that may operate as a detector. Other detector configurations and various detector technologies may be employed to function as the detector 214.

The controller 202 may have an ambient light sensor 226 that may operate as ambient light sensor 110 that was described in embodiment 100.

The waveform generator 224 may generate waveforms that are coupled to the respective laser beams. In one example, an alternating current waveform of 1 kHz may be used for one laser beam while a second laser beam may be coupled to a 1.4 kHz waveform. Some embodiments may use waveforms greater than 1 kHz, such as waveforms greater than 10 kHz, 30 kHz, 50 kHz, 100 kHz, 1 MHz, 10 MHz, or higher. Other embodiments may use waveforms less than 1 kHz, such as 500 Hz, 100 Hz, 60 Hz, 50 Hz, or lower.

In some embodiments, the detector sensor 220 may detect light in a wide variety of frequencies and may generate a signal proportional to the white light received by the sensor 220. In other embodiments, the detector sensor 220 may be tuned or filtered to receive light in a range of wavelengths that include the wavelengths of the lasers 204 and 206.

Some embodiments may use the same colored lasers for lasers 204 and 206, while other embodiments may have different colored lasers.

Figure 3:
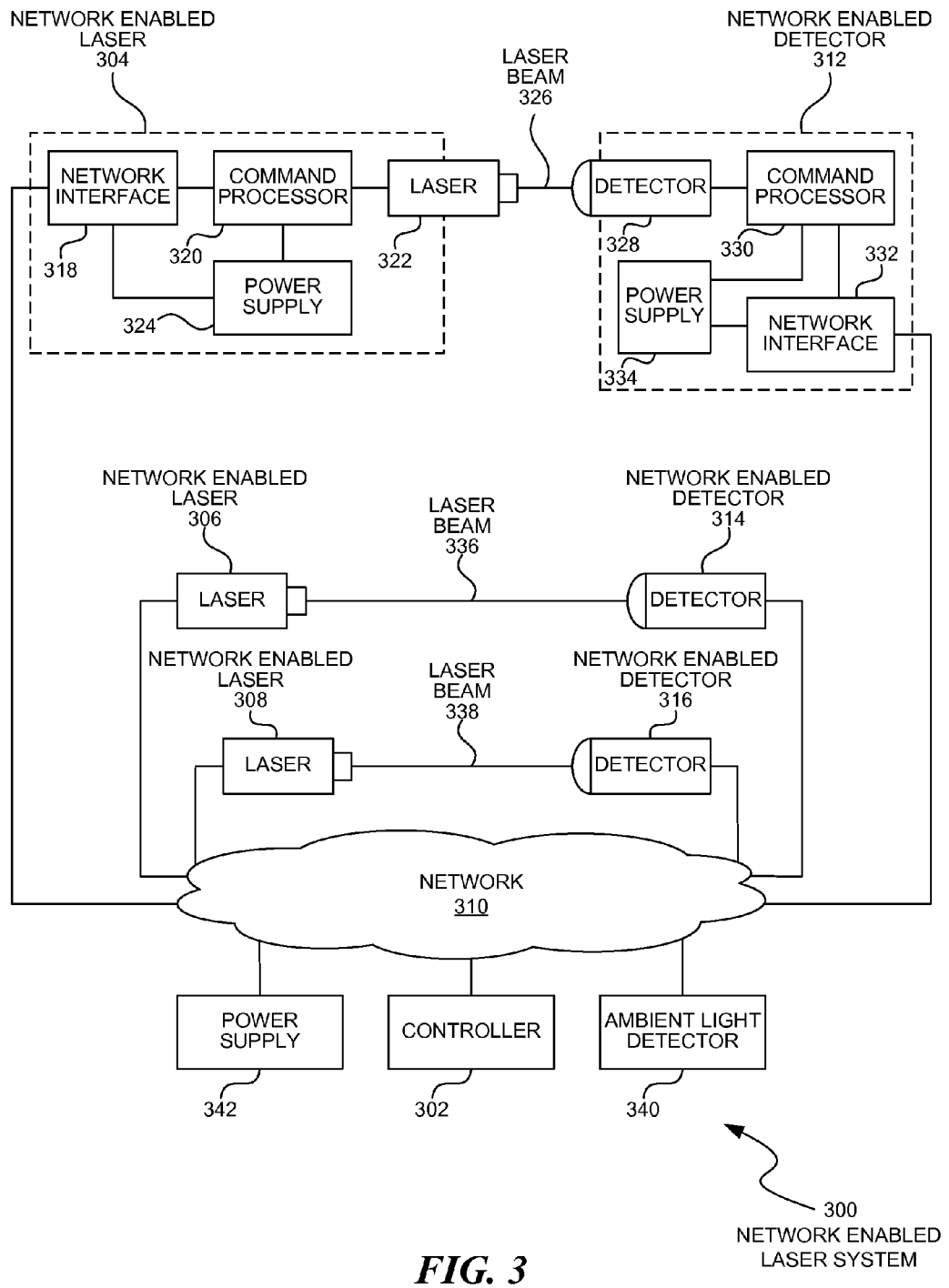
FIG. 3 is a diagram of an embodiment showing an example of a network based laser system.

FIG. 3 is a diagram of an embodiment 300 showing a system with network connected lasers and detectors. Embodiment 300 is a simplified example of a system that might be used in a security system, laser maze game attraction, or other application where multiple lasers may be used to sense objects or humans.

The diagram of FIG. 3 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 300 has a controller 302 that may control several network enabled lasers 304, 306, and 308, and receive input signals from network enabled detectors 312, 314, and 316. The lasers may produce laser beams 326, 336, and 338, respectively. The communication and control between the controller 302 and the various lasers and detectors may be through a network 310.

The network 310 may be any network through which the controller 302 may communicate with the lasers and detectors. In one embodiment, an Internet Protocol communication layer may be operated over an Ethernet hardware connection as the network 310.

A network enabled laser 304 may comprise a network interface 318, a command processor, and the laser 322. The network enabled laser 304 may also include a power supply 324. The network enabled laser 304 may be assembled and mounted within a single enclosure as a single device in some embodiments, while in other embodiments, the network enabled laser 304 may be housed in multiple enclosures or devices.

Similarly, the network enabled detector 312 may include a detector 328, a command processor 330, a network interface 332 and a power supply 334. The network enabled detector 312 may be housed in a single enclosure as a single device or may consist of several devices operating together.

The command processor 320 within the laser and command processor 330 within the detector may send and receive commands from the controller 302. The command processors may be controllers dedicated to the respective laser or detector in some embodiments.

In some embodiments, the network 310 may be capable of distributing power to the lasers and/or the detectors. In an Ethernet embodiment, one such technology may be Power over Ethernet (PoE). In such a case, a single power supply 342 may provide power to the network and the network may distribute power to the various lasers and detectors. In other embodiments, the lasers and detectors may have separate power supplies.

Similar to embodiments 100 and 200, embodiment 300 may include an ambient light detector 340. The ambient light detector 340 may operate in a similar manner as ambient light detector 110 of embodiment 100.

In the embodiment 300, the controller 302 may operate the various lasers by detecting the respective laser beams and turning off the lasers or switching to a low power mode when the laser beam is not detected.

The controller 302 may operate so that a change to one laser beam will enable that laser to be turned off while allowing the other lasers to continue to operate in high power mode. In some embodiments, the controller 302 may have a routine to assign specific detectors with specific lasers so that the lasers may be controlled independently.

Figure 4:
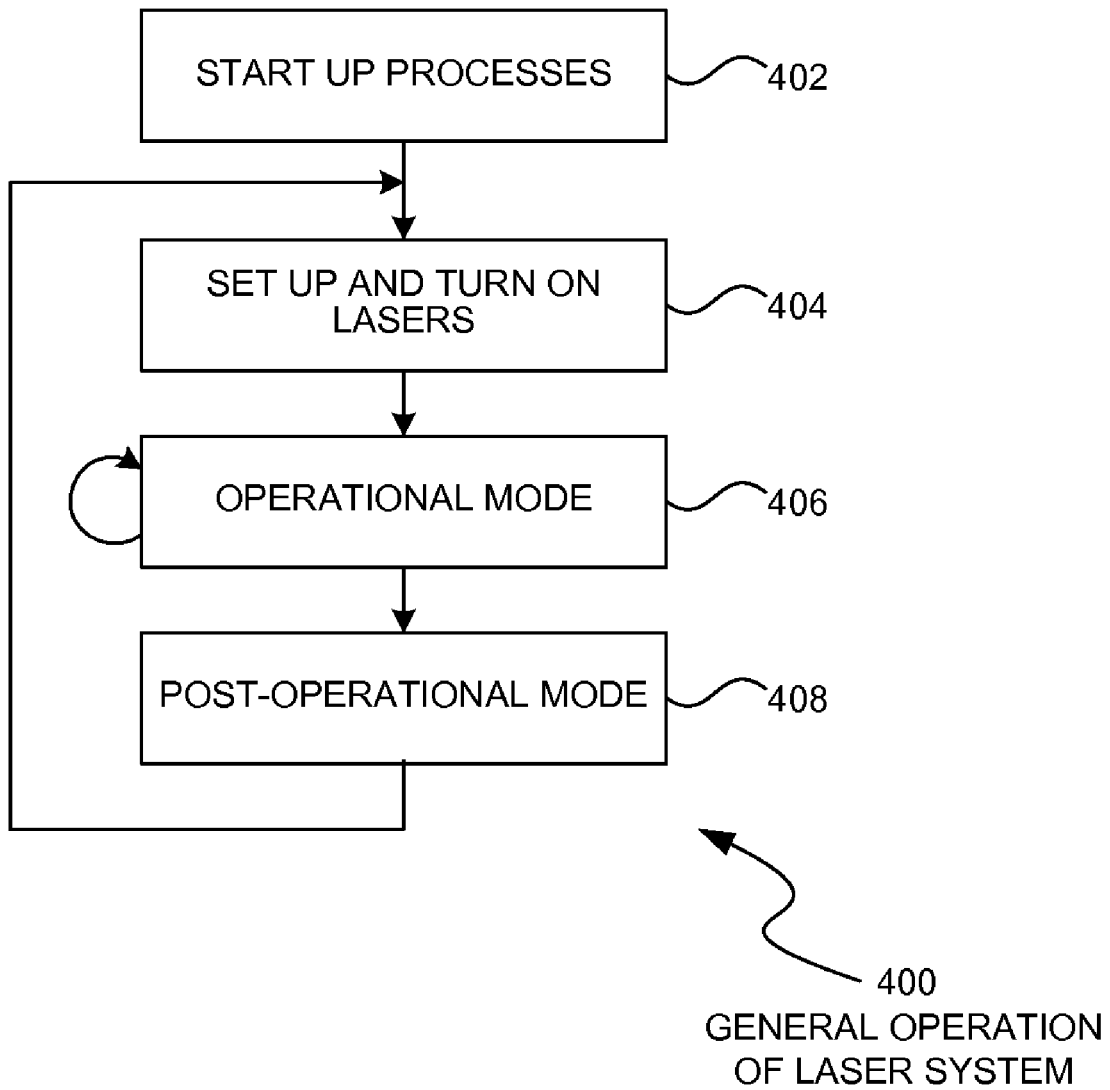
FIG. 4 is a flowchart illustration of an embodiment showing a general operation of a laser system.

FIG. 4 is a flowchart illustration of an embodiment 400 showing a general method for operating a laser detection system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates the general process of operating a laser. Various startup processes may be performed in block 402, then the setup and turn on process in block 404 may illuminate the lasers. When the lasers are illuminated properly in block 404, the process may proceed into an operational mode 406. When a laser beam is broken or other condition occurs, the operation may proceed to a post operational mode in block 408.

Embodiment 400 may be used in a security system, for example. During the startup processes of block 402, the security system may become armed. Through the setup and turn on operation of block 404, the lasers and detectors may be turned on, checked, and configured for operation. During the operational mode of block 406, the detectors may be continually polled to determine if a laser beam has been broken. In some embodiments, a processor with an interrupt mechanism may be used to sense that a laser beam may be broken. If a laser beam has been broken, or for some other reason, the post operational mode may be initiated. In the example of a security system, a post operational mode in an emergency situation may involve alerting a security guard, setting off an alarm, locking certain doors, or other actions in response to the detection. A normal post operational mode may be used to shut down the security system in an orderly fashion, for example, when a business secured by the detection system is opened for business after being closed over a weekend.

In another use scenario, embodiment 400 may illustrate a use for a laser maze game or amusement attraction. During the startup process of block 402, a user may validate payment and otherwise cause the game to begin. After starting the lasers in block 404, the game may enter an operational mode in block 406 during gameplay. The gameplay may end due to a timeout, an error, or other reason and enter a post operational mode in block 408 where the user's score may be tabulated and displayed.

Embodiments 500 and 600 illustrate detailed examples of processes that may be performed during the operations of blocks 404 and 406 of embodiment 400.

Figure 5:
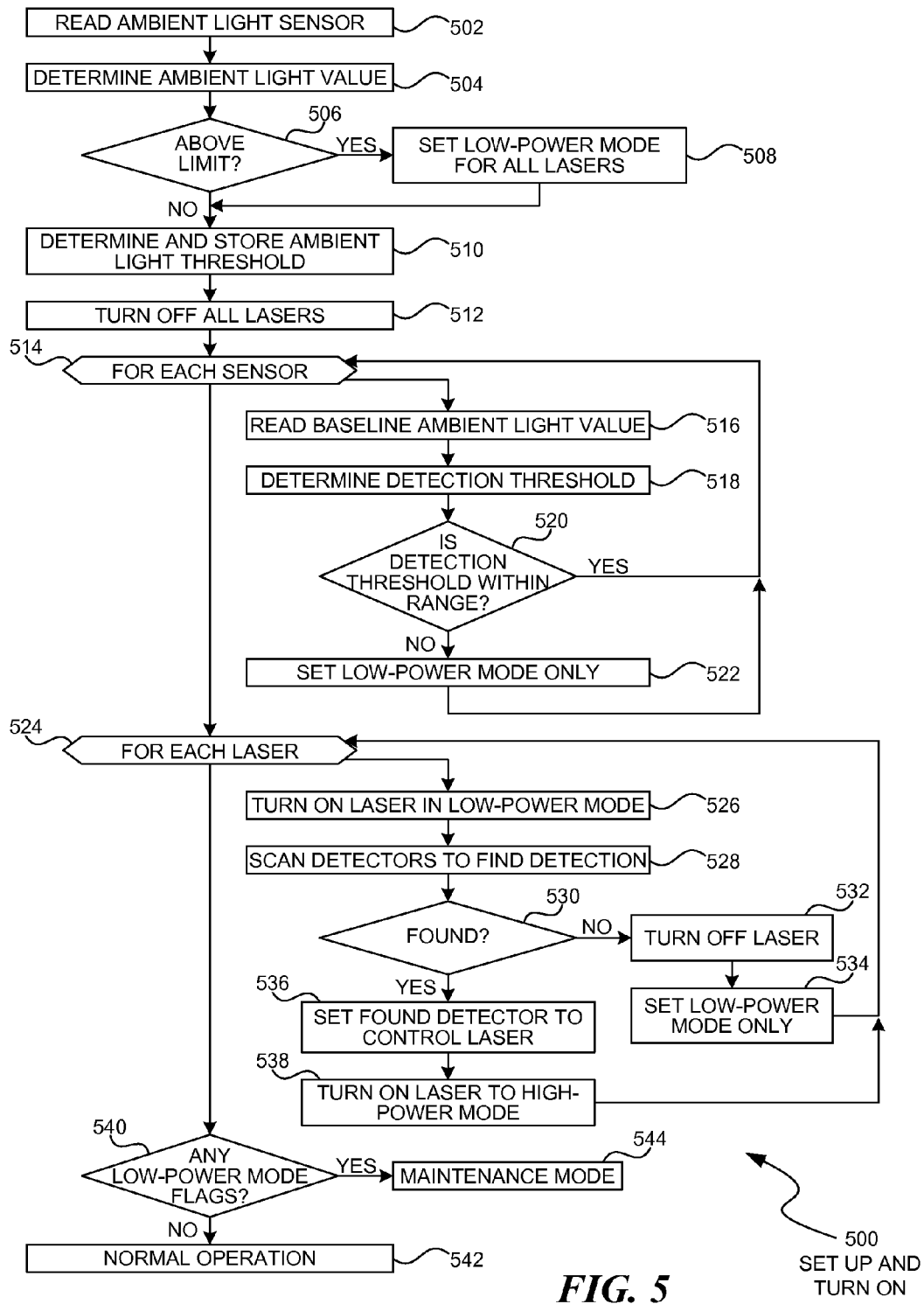
FIG. 5 is a flowchart illustration of an embodiment showing a setup and turn on method for a laser system.

FIG. 5 is a flowchart illustration of an embodiment 500 showing one example of a method for setting up and turning on lasers in a laser detection system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method for setting up and turning on lasers for a laser detection system. The embodiment performs some functions without the lasers turned on to determine ambient light and set various thresholds. If the ambient light levels are suitable, each laser is turned on at a low power mode. If the laser is sensed, the laser may be turned to a high power mode. The low power mode may be a mode where the laser light may be at or below a safe level, such as Class 1 or Class 2 lasers. The low power mode may be any power level that is higher than the safe level, such as Class 2, Class 3B, Class 3R, and even Class 4 in some embodiments.

The embodiment uses an ambient light sensor for determining a baseline ambient light value. The ambient light sensor may be read in block 502 and the ambient light value may be determined in block 504. If the ambient light value is above a predefined limit in block 506, the lasers may be set to only low power mode in block 508.

The predefined limit in block 506 may be a value set of the system that may indicate that too much ambient light is present for effective sensing of the laser beams. When an excess of ambient light is present, the lasers may be operated in a low power mode which may be safe for human interaction.

An ambient light threshold may be determined and stored in block 510. During operational mode, a change to the ambient light threshold may cause the detection thresholds of the detectors to be changed and may also cause the system to exit operational mode if the ambient light rises too high.

In block 512, all of the lasers may be turned off. Each sensor may be processed in block 514 to read a baseline ambient light value in block 516 and determine a detection threshold in block 518. In block 520, the detection threshold may be compared to a range of acceptable detection thresholds. If the detection threshold is within range in block 520, the process may continue with another sensor. If the detection threshold is outside of the range, the lasers may be operated in low power mode only in block 522.

The process of blocks 512 through 522 cycles through each sensor and adjusts the detection threshold based on a baseline ambient light detected by the sensor. This process allows the detection threshold to be a function of baseline ambient light, so that sensors that are exposed to high ambient light may have a higher threshold for determining that a laser beam is present, while sensors that are exposed to low ambient light may have a low threshold. In some embodiments, lower thresholds may provide a more sensitive or accurate detection while higher thresholds may be less sensitive or accurate.

In block 524, each laser may be processed and turned on. The laser may be turned on in low power mode in block 526 and the detectors may be scanned in block 528 to find a sensor that detects the laser. If the laser is not found in block 530, the laser may be turned off in block 532. In some embodiments, the laser may be set to low power mode only in block 534.

If the laser is found in block 530, the detector that sensed the laser may be set to control the laser in block 536 and the laser may be turned to high power mode in block 538.

The process of blocks 524 through 538 illustrate a method for turning on the lasers by first using a safe power level and, when the laser is affirmatively sensed, advancing the laser to a higher power level. The process also allows for a scan of the detectors to determine which of the detectors may be used to control a laser. In some cases, a single detector may be used to detect and control two or more lasers, such as in embodiment 200.

The process of scanning each detector may involve querying each detector to see if the detector senses a light value higher than the detection threshold set in block 518. If the detector senses significantly more light due to the laser having been turned on, the detector can be assumed to be receiving a laser beam from the laser.

Because each detector may be scanned, the process may allow a newly configured system to automatically determine which lasers are pointing to which detectors. Such a feature may be useful in an application where many lasers and detectors are used, and may simplify installation and wiring of the system.

In some embodiments, the scanning operation may identify a laser and detector pair, where the detector senses a laser beam created by the laser. The detector may be used to control that particular laser. In some embodiments, the laser-detector pair may be verified against a predefined list of expected laser-detector pairs. The verification may check that the lasers and detectors are properly configured and positioned as expected.

If any of the lasers are set to low power mode in block 540, the system may enter a maintenance mode in block 544. Maintenance mode may be an operational mode where a technician may align lasers to sensors or perform other operations that may enable the normal operational mode.

If no low power mode lasers exist in block 540, the process may enter normal operational mode in block 542. An example of a normal operational mode is presented in embodiment 600.

Figure 6:
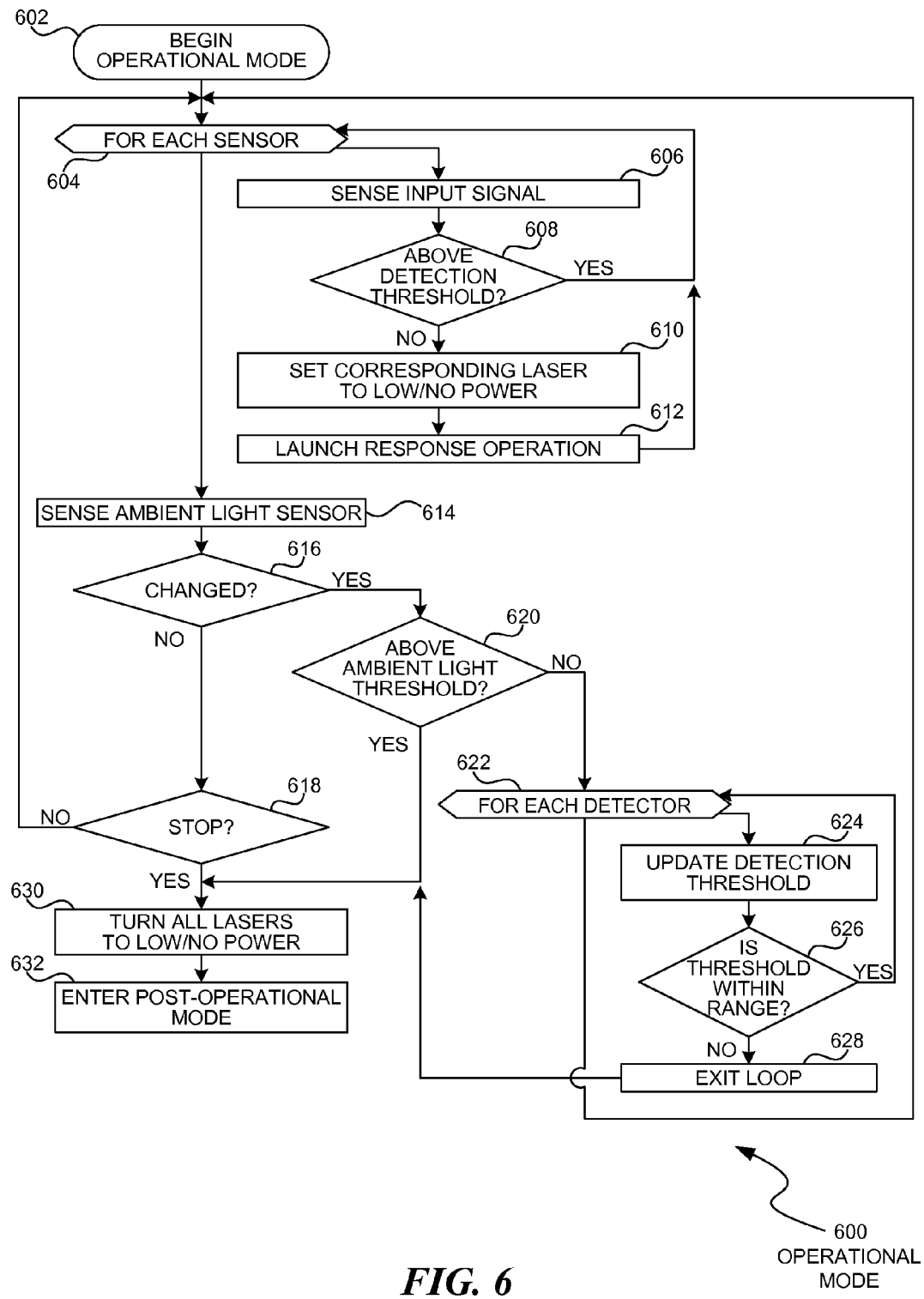
FIG. 6 is a flowchart illustration of an embodiment showing an operational mode method for a laser system.

FIG. 6 is a flowchart illustration of an embodiment 600 showing an example of an operational mode of a laser detection system. Embodiment 600 may be one example of a process that may be performed as block 406 of embodiment 400.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operational mode of embodiment 600 illustrates a method by which lasers may be operated at high power levels but provide several safety mechanisms that may allow a system to be classified as safe as a lower power level laser system.

Embodiment 600 may be entered after successfully completing a process such as embodiment 500 that permits lasers to be operated in high power mode only after the lasers were properly sensed in a low power mode. When embodiment 500 is successfully completed, the lasers may transmit a laser beam that is affirmatively detected by a detector. In such a state, a human cannot be exposed to the laser beam because each laser beam is being received by a detector.

Embodiment 600 operates by detecting if a laser beam has been broken and shutting off the corresponding laser or setting that laser to a low power level. Additionally, if ambient light has changed, the detection thresholds for each sensor may be updated. Based on the change in ambient light, the process may be exited if the ambient light causes a threshold value to be exceeded.

Operational mode may begin in block 602.

For each sensor in block 604, the input signal may be sensed in block 606 and if the signal is above the detection threshold in block 608, the process may return to block 604. When the signal is above the detection threshold in block 608, the detector senses that the laser beam is present.

If the signal is below the detection threshold in block 608, the corresponding laser may be set to low power or no power in block 610 and a response operation may be launched in block 612. A response operation may alert a security guard in an example of a security system, or in the example of a laser maze, the response operation may cause a light to flash, a noise to be made, and a user's score to be changed.

The process of blocks 604 through 612 may be performed quickly so that the time from detection of a laser beam break to turning off the laser or causing the laser to enter a low power mode is 0.25 seconds or less. In some cases, the timing may be 0.5 seconds, 0.4 seconds, 0.3 seconds, 0.27 seconds, 0.2 seconds, or 0.1 seconds.

In many embodiments, the timing of detecting a laser beam break and turning off the laser may be a factor in ensuring the safety of the system. In some such embodiments, the operations of blocks 604 through 612 may be performed by hardware circuits or by processors that have dedicated processing availability. In some embodiments, a separate hardware circuit or processor may be used for controlling each laser or for controlling a limited number of lasers. Such embodiments may operate in a continual monitoring mode once the lasers are set to high power mode, and may monitor multiple detectors in parallel.

In block 614, the ambient light detector may be sensed. If the ambient light has not changed in block 616 and there is no other reason to exit operational mode in block 618, the process may return to block 604.

If the ambient light has changed in block 616, and the ambient light is above an ambient light threshold in block 620, the detection thresholds for the sensors may be adjusted using the process of blocks 622 through 628.

In block 622, each detector may be evaluated. For each detector, the detection threshold may be updated in block 624 based on the change in the ambient light of block 614. If the threshold is within a predetermined range in block 626, the process may return to block 622.

If the threshold is outside of a predetermined range in block 626, the ambient light has saturated the detector such that the detector may not be able to discriminate between the laser beam and ambient light. In such a case, the loop of block 622 may be exited in block 628 and all lasers may be turned to a low power or no power mode in block 630. Such an exit may be an unexpected or emergency exit of normal operations. After the lasers are turned to a safe mode in block 630, the process may enter a post-operational mode in block 632.

The process may enter the post-operational mode by exiting the loop of block 618. In some embodiments, the detection of a single laser beam being broken may cause the normal operations to cease. In other embodiments, several or even all of the laser beams may be broken without causing normal operations to be exited.

The decision to exit normal operations in block 618 may be caused by an outside action, such as a signal to exit from a user or other device.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A laser controller comprising:
   a first laser output configured to turn on and off a first laser and further configured to set a power level for said first laser, said first laser transmitting light in the visible spectrum;
   a first detector input configured to receive a first input signal from a first laser sensor, said first laser sensor being oriented to receive a first laser beam from said first laser;
   a processor configured to control said first laser by a method comprising:
   sensing said first input signal when said first laser is turned off to determine a baseline ambient light value; and
   determining that said baseline ambient light value is below an ambient light threshold and turning on said first laser to a first power level to create said first laser beam.

2. The laser controller of claim 1, said processor further configured to:
   after turning on said first laser to said first power level, sensing said first input signal to determine a first received value; and
   determining that said first received value is above said baseline ambient light value and changing said first laser to a second power level, said second power level being higher than said first power level.

3. The laser controller of claim 2, said processor further configured to:
   while operating said first laser at said second power level, detecting that said first input signal is below said detection threshold by said first detector and turning said first laser to a third power level, said third power level being less than said second power level.

4. The laser controller of claim 3, said third power level being said first power level.

5. The laser controller of claim 4, said processor further configured to cause said laser to repeatedly turn on and off when operating at said third power level.

6. The laser controller of claim 3, said third power level being turned off.

7. The laser controller of claim 3, said turning said first laser to said third power level being performed within 0.25 seconds of said detecting that said laser beam is not being sensed.

8. The laser controller of claim 1 further comprising:
   an ambient light input configured to receive an ambient light input signal from an ambient light sensor, said ambient light input signal being used at least in part to determine said ambient light threshold.

9. The laser controller of claim 8, said processor further configured to:
   detect that said ambient light input signal has exceeded a maximum ambient light threshold and turning said first laser to a third power level.

10. The laser controller of claim 8, said processor further configured to:
    determine a lower sensing threshold from said ambient light input signal.

11. The laser controller of claim 10, said determining a lower sensing threshold being performed on a periodic basis.

12. The laser controller of claim 10, said determining a lower sensing threshold being performed in response to detecting that said ambient light signal has changed.

13. The laser controller of claim 1 further comprising:
    a second laser output configured to turn on and off a second laser and further configured to set a power level for said second laser, said second laser transmitting light in the visible spectrum, said second laser being oriented to transmit a second laser beam to said first detector; and
    said processor further configured to:
    apply a first signal to said first laser and a second signal to said second laser and to detect the presence of said first signal and said second signal from said first input signal.

14. The laser controller of claim 13, said first signal and said second signal being alternating current signals causing said first laser beam and said second laser beam to contain said first signal and said second signal, respectively.

15. The laser controller of claim 14, said processor further configured to control said second laser by turning off said second laser when said second signal is not detected in said first input signal.

16. The laser controller of claim 13 further comprising:
a second detector input configured to receive a second input signal from a second laser sensor; and
said processor further configured to apply a first signal to said first laser and a second signal to said second laser and to detect the presence of said first signal and said second signal from said first input signal and said second input signal.

17. The laser controller of claim 16, said processor further configured to:
cause said first laser to turn on;
detect said first laser with said first detector;
cause said second laser to turn on; and
detect said second laser with said second detector.

18. A laser controller comprising:
a first laser output configured to turn on and off a first laser and further configured to set a power level for said first laser, said first laser transmitting light in the visible spectrum;
a first detector input configured to receive a first input signal from a first laser sensor, said first laser sensor being oriented to receive a first laser beam from said first laser;
a processor configured to control said first laser by a method comprising:
causing said first laser to turn on to a first power level, said first power level being a safe power level for continuous human exposure;
detecting said first laser beam using said first detector, and based on said detecting, setting said first laser to a second power level, said second power level being higher than said first power level.

19. The laser controller of claim 18, said method further comprising:
while said first laser beam is being transmitted at said first power level, determining that said first laser beam is not detected and changing said first laser beam to a third power level, said third power level being no higher than said first power level.

20. The laser controller of claim 19, said third power level being set less than 0.25 second after said determining.

* * * * *